United States Patent [19]
Fanelli et al.

[11] Patent Number: 5,250,251
[45] Date of Patent: Oct. 5, 1993

[54] AQUEOUS PROCESS FOR INJECTION MOLDING CERAMIC POWDERS AT HIGH SOLIDS LOADINGS

[75] Inventors: Anthony J. Fanelli, Rockaway; Gary B. Marsh, Pittstown; Joan V. Burlew, Rockaway; Clifford P. Ballard, Lebanon; William S. Frei, Stanhope, all of N.J.

[73] Assignee: AlliedSignal Inc., Morris Township, Morris County, N.J.

[21] Appl. No.: 860,919

[22] Filed: Mar. 31, 1992

Related U.S. Application Data

[63] Continuation-in-part of Ser. No. 748,151, Aug. 22, 1991, abandoned.

[51] Int. Cl.$^5$ .............................................. C04B 35/64
[52] U.S. Cl. ........................ 264/328.2; 264/328.14; 264/328.17; 264/63; 264/109
[58] Field of Search ............... 264/28, 328.2, 328.17, 264/328.14, 63, 109

[56] References Cited

U.S. PATENT DOCUMENTS 4,113,480  9/1978  Rivers .
4,734,237  3/1988  Fanelli .......................... 264/328.2
5,087,595  2/1992  Marsh ............................ 264/328.2

OTHER PUBLICATIONS

H. H. Selby et al., "Agar", Industrial Gums, Academic Press, New York, N.Y., 2nd. ed., (1973), Chapter 3, p. 29.

*Primary Examiner*—James Derrington
*Attorney, Agent, or Firm*—Ernest D. Buff; Gerhard H. Fuchs

[57] ABSTRACT

A process for shaping parts from ceramic powder that comprises the steps of (1) forming a concentrated mixture in excess of 40% ceramic solids by volume, the mixture comprising ceramic powder, a gel forming material chosen from the class of polysaccharides known as "agaroids", and a gel forming material solvent and being formed in a blender that provides a shearing action and is heated to raise the temperature of the mixture to about 70° C. to 100° C.; and (2) molding the mixture at a temperature sufficient to produce a self-supporting structure comprising the powder and gel. The parts exhibit excellent green strength and are rapidly fired without cracking, distortion or shrinkage problems.

15 Claims, 2 Drawing Sheets

Injection Molding Process

AQUEOUS PROCESS FOR INJECTION MOLDING CERAMIC POWDERS AT HIGH SOLIDS LOADINGS

CROSS REFERENCE TO RELATED APPLICATION

This is a continuation-in-part of U.S. application Ser. NO. 748,151, filed Aug. 22, 1991.

BACKGROUND OF THE INVENTION

1. Field of the Invention

This invention relates to processes for shaping ceramic parts from powders, and molding compositions therefor. More particularly, the invention is directed to molding processes and molding compositions for forming high quality, complex parts which exhibit excellent green strength and which can be readily fired without experiencing the cracking, distortion and shrinkage problems commonly associated with prior art sintered products.

2. Description of the Prior Art

Several forming methods for ceramic bodies are commonly practiced. In one popular shape forming method, namely, slip casting, a liquid suspension of ceramic powder is "de-watered" in a porous mold, producing a powder cake in the shape dictated by the mold. Dry pressing involves compaction of a powder in a die. The powder usually contains a processing aid which serves as plasticizer and/or binder for the green compact.

One objective of any forming method is to produce green parts which can be sintered to a shape reproducible to close dimensional tolerances, free from defects During green-forming and sintering, cracks, distortions and other defects can arise due to the shrinkage associated with the particle consolidation processes. It is generally recognized that these defect-producing processes are mitigated by producing green bodies of high green density, which reduces the amount of shrinkage that the body must undergo during consolidation and sintering.

Another objective of shape-forming methods is to produce articles having net-shape, eliminating or minimizing the need for downstream operations, such as machining, to obtain final part dimensions. Dry pressing, in particular, frequently requires additional downstream processing in the form of machining and diamond grinding to attain intricate shapes, non-symmetrical geometrical formats and close tolerances.

Injection molding is recognized as a premier net-shape forming method for ceramic and metal powders. However, to realize the potential economic benefits offered by injection molding over other recognized less net-shape forming methods (e.g., dry pressing), it is necessary to minimize the number and complexity of the processing steps involved in the overall process. In addition, it is desirable that the molding compositions allow high solids loading to minimize shrinkage during binder burn-out and sintering to minimize defects as described above.

U.S. Pat. No.4,113,480 discloses the use of agaroid binders in forming ceramic or metal parts. The examples cited reflect relatively low solids concentrations, <40 vol % of the formulations. Furthermore, the preferred embodiment of the process, as exemplified in the flow chart appearing in FIG. 2 of the drawings, teaches a sequence of steps including a step in which the batch formulation is concentrated in solids by evaporation of some of the water required in preceding processing operations. Evaporation of large amounts of water as a means of solids adjustment is a time and cost penalty, that in certain cases, renders the injection molding process uneconomical with respect to other shape forming processes.

SUMMARY OF THE INVENTION

The present invention provides aqueous molding compositions and a process useful in forming ceramic articles. Advantageously, molding is carried out at high solids loading and maintained thereat during processing, thereby eliminating the need to concentrate the molding formulations by evaporation of large amounts of water. More specifically, in accordance with the invention, there is provided a process for shaping parts from ceramics which comprises the steps of forming a concentrated mixture in excess of 40% ceramic content by volume comprising ceramic powder(s), a gel-forming material chosen from the class of polysaccharides known as agaroids, and a gel-forming material solvent the mixture being formed in a blender that provides shearing action thereto and the blender being heated to raise the temperature of the mixture to about 70° C. to 100° C., and preferably about 80° C. to 95° C.; supplying the mixture to a mold, and molding the mixture under conditions of temperature and pressure to produce a self supporting structure.

The invention is also drawn to an injection molding process comprising the steps of forming a concentrated mixture in excess of 40% ceramic content by volume comprising ceramic powder(s), a gel forming material chosen from the class of polysaccharides known as agaroids, and a gel forming material solvent, the mixture being formed in a blender that provides shearing action thereto and the blender being heated to raise the temperature of the mixture to about 70° C. to 100° C., and preferably about 80° C. to 95° C.; injecting the mixture at temperature above the gel point of the gel forming material into a mold, cooling the mixture in the mold to a temperature below the gel point of the gel forming material to produce a self supporting structure and removing the structure from the mold.

BRIEF DESCRIPTION OF THE DRAWINGS

The invention will be more fully understood and further advantages will become apparent when reference is made to the following detailed description and the accompanying drawings in which.

DETAILED DESCRIPTION OF THE INVENTION

As used herein the term ceramic powder is intended to include, without limitation, powders of such materials as oxides, borides, nitrides, silicides, and carbides of metals, non-metals or mixtures thereof, and mixtures of such materials.

According to the process of this invention, the ceramic powder is initially mixed with a gel forming material and a solvent for the gel forming material. This mixture is proportioned with a carrier to be fluid enough to enable it to be readily supplied to a die by any of a variety of techniques, and especially by injection molding. Generally, the amount of powder in the mixture is between about 35% and about 60% by volume of the mixture. Preferably, the powder constitutes between about 40% and about 58% by volume of the mixture, and most preferably constitutes between about 45% and about 55% by volume of the mixture. The preferred and most preferred amounts are especially suited for production of net and near net shape injection molded parts.

Figure 1:
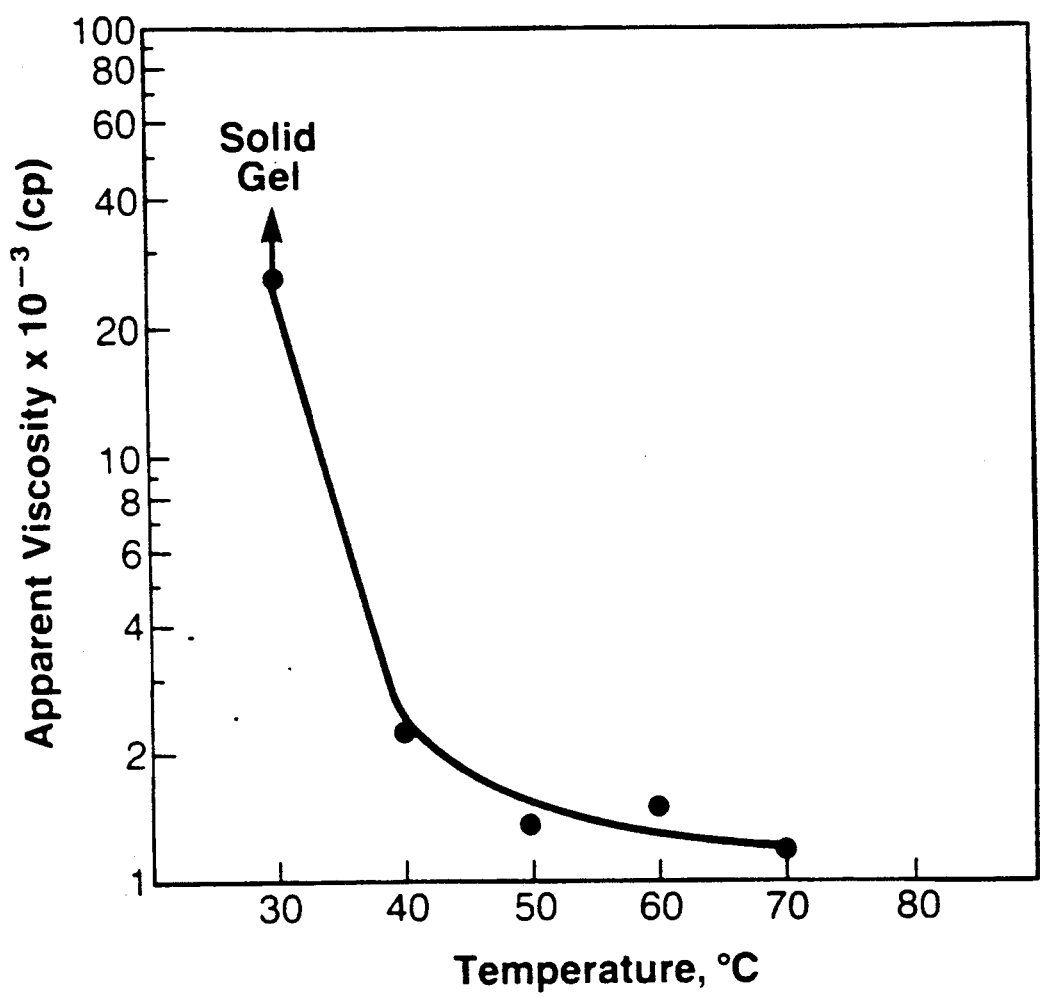
FIG. 1 is a graphic representation of the apparent viscosity of a 2 wt % aqueous solution of agar at various temperatures.
Figure 2:
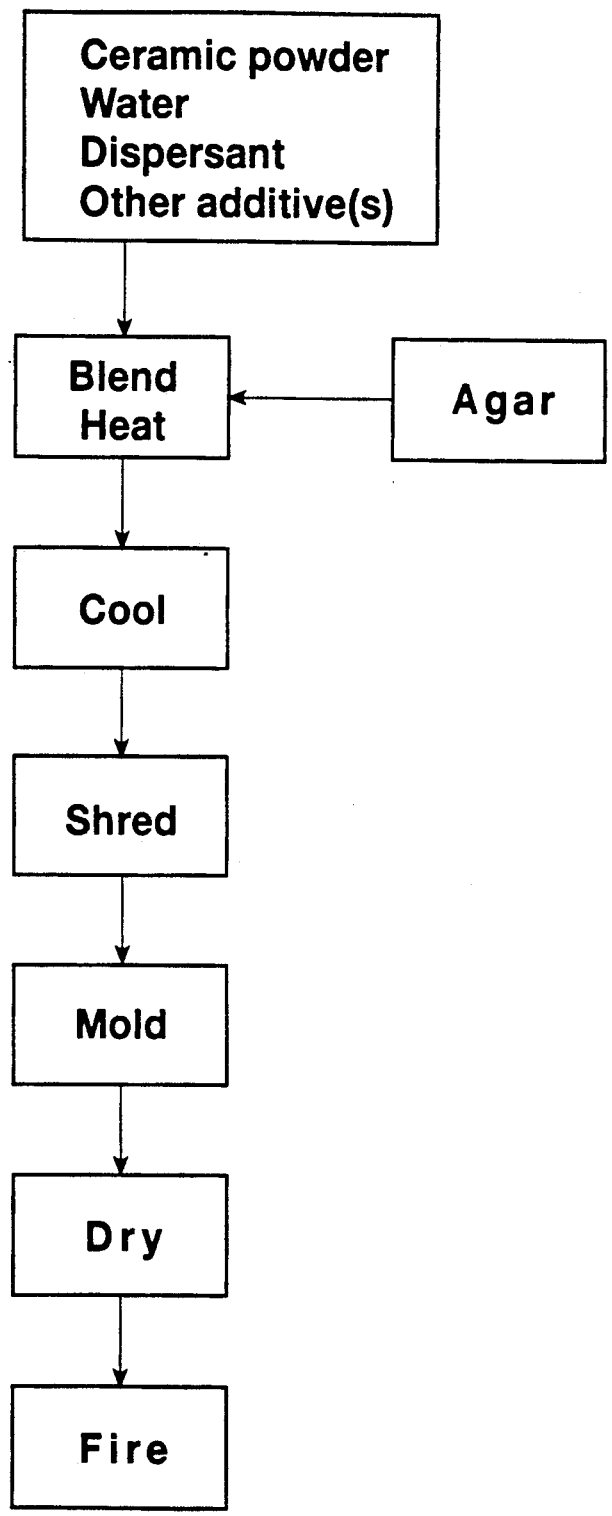
FIG. 2 is a schematic representation of the basic steps of one embodiment of the process of the invention.

The gel forming material employed in the mixture comprises an agaroid An agaroid has been defined as a gum resembling agar but not meeting all of the characteristics thereof (See H. H. Selby et al., "Agar", *Industrial Gums*, Academic Press, New York, N.Y., 2nd ed., 1973, Chapter 3, p. 29). As used herein, however, agaroid not only refers to any gums resembling agar, but also to agar and derivatives thereof such as agarose. An agaroid is employed because it exhibits rapid gelation within a narrow temperature range, a factor which can dramatically increase the rate of production of articles. More importantly, the use of such gel forming materials substantially reduces the amount of binder needed to form a self supporting article. Thus, articles produced by using gel forming materials comprising agaroids can significantly enhance the production of net shape and near net shape objects. Moreover, the production of complex articles from agaroid containing mixtures is dramatically improved as a result of the substantial reduction in the firing regimens necessary to produce a fired product. The preferred gel forming materials are those which are water soluble and comprise agar, agarose, or carrageenan, and the most preferred gel forming materials consist of agar, agarose, and mixtures thereof. FIG. 1 illustrates the basic features of the gel forming material by graphically depicting the change in viscosity of a preferred gel forming solution (2 wt % agar solution). The graph illustrates the features of our gel forming materials: low gel forming temperature and rapid gelation over a narrow temperature range.

Gel strength of the gel forming material is measured by using an apparatus commonly employed in the manufacture of industrial gums. The apparatus consists of a rod having a circular cross-sectional area of 1 cm$^2$ at one end thereof which is suspended above one pan of a triple beam balance. Initially, a large container is placed on each pan of the triple beam balance. The container placed on the pan (above which the rod is suspended) is filled with about 200 mL (volume) of a gel consisting of about 1.5 wt % of the gel forming material and water. The empty container is then balanced against the gel containing vessel. The rod is then lowered into contact with the top surface of the gel. Water is then metered into the empty container and the position of the balance pointer is continuously monitored. When the top surface of the gel is punctured by the rod, the balance pointer rapidly deflects across the scale and the water feed is immediately discontinued. The mass of water in the container is then measured and the gel strength (mass per unit area) is calculated.

The gel forming material is provided in an amount between about 0.5 wt % and about 6 wt % based upon the solids in the mixture. More than about 6 wt % of the gel forming material may be employed in the mixture. Higher amounts are not believed to have any adverse impact on the process, although such amounts may begin to reduce some of the advantages produced by our novel compositions, especially with respect to the production of net shape and near net shape bodies. Most preferably, the gel forming material comprises between about 1% and about 3% by weight of solids in the mixture.

The mixture further comprises a gel forming solvent; the solvent is added in an amount sufficient to dissolve the gel forming material. While any of a variety of solvents may be employed depending upon the composition of the gel forming material, particularly useful solvents for agaroid containing gel forming materials are polyhedric liquids, particularly polar solvents such as water or alcohols. It is, however, most preferable to employ a solvent which can also perform the dual function of being a carrier of the mixture, thus enabling the mixture to be easily supplied to a mold. We have discovered that water is particularly suited for serving the dual purpose noted above.

A liquid carrier is normally added to the mixture to produce a homogeneous mixture of the viscosity necessary to make the mixture amenable to being molded by the desired molding process. Ordinarily, the liquid carrier is added in an amount that is necessary to produce a homogeneous mixture and to insure the proper fluidity of the mixture. Generally, the amount of a liquid carrier is an amount between about 40% to about 60% by volume of the mixture depending upon the desired viscosity thereof less the amount of solvent employed to dissolve the gel forming material. In the case of water, which performs the dual function of being a solvent and a carrier for agaroid containing mixtures, the amount is simply between about 40% and about 60% by volume of the mixture, with amounts between about 45% and about 55% by volume being preferred. In addition, because of its low boiling point, water is easily removed from the self supporting body prior to and/or during firing.

The mixture may also contain a variety of additives which can serve any number of useful purposes. For example, dispersants (e.g., Darvan C) may be employed to ensure a more homogeneous mixture. Lubricants such as glycerine may be added to assist in feeding the mixture along the bore of an extruder barrel and additives such as glycerine to reduce the vapor pressure of the liquid carrier and enhance the production of the near net shape objects. The amount of additives will vary depending on the additive and its function within the system. However, the additives must be controlled to ensure that the gel strength of the gel forming material is not substantially destroyed. For example, dispersing agents such as Darvan C are ordinarily added in an amount of about 1% by weight of the solids in the mixture, whereas glycerine may be added in amounts ranging from about 1% to about 10% by weight or higher of the mixture without adversely affecting the gel strength of the gel forming material while maintaining the required performance levels of the additives. Table 1 describes additives such as lubricants and vapor pressure reducers and their effect upon the gel strength of the gel forming material (measured at room temperature).

TABLE 1

| | Effect of Additives | | |
|---|---|---|---|
| Additives | (Wt %) | Agar (wt %) | Gel Strength (g/cm$^2$) nominal |
| None | — | 3.6 | 1850 |
| s-butanol | 4 | 4 | 1900 |
| Ethylene glycol | 4 | 4 | 1900 |
| Glycerine | 11 | 3 | 1700 |

TABLE 1-continued

| | Effect of Additives | | |
|---|---|---|---|
| Additives | (Wt %) | Agar (wt %) | Gel Strength (g/cm² ) nominal |
| Glycrine | 18 | 3 | 1750 |

The components of the molding formulation are compounded in a heated blender that provides shearing action thereto creating a homogeneous mixture of high viscosity. The shearing action is instrumental in producing compositions of high solids loading in a dispersed and uniform state, highly suitable for subsequent injection molding. Ability to form uniform compositions of high solids loading is desirable in the production of injection molded parts. Use of compositions with high solids concentration results in lower shrinkages when the molded parts are dried and fired, facilitating dimensional control and mitigating the tendency for cracks to form during the densification process. The benefits afforded by this process include higher yields of acceptable product and lower scrap rates. This can have a significant effect on the cost of the overall process and may determine whether injection molding is lower in cost relative to other fabrication processes for a particular component.

As practiced in the current invention, the blended composition containing the components of the ceramic mixture, water, dispersant, other additives, if used, and the agaroid was removed from the blender after cooling to a temperature below the gel point of the agaroid, and further shredded to form a material having a particulate consistency. This was especially useful in producing material in a form convenient for molding in conventional injection molding machines, and for being able to store the material for molding at a later date. Alternatively, the material after blending could be granulated before cooling, e.g., by passing the material directly through an extruder and cutting the extrudate as it exits the die.

The mixture is transported to the mold at a temperature above the gel point (temperature) of the gel forming material. Ordinarily, the gel point of the gel forming material is between about 10° C. and about 60° C., and most preferably is between about 30° C. and about 45° C.

The mixture is supplied to the mold by any of a variety of well known techniques including gravity feed systems, and pneumatic or mechanical injection systems. Injection molding is the most preferred technique because of the fluidity and low processing temperatures of the mixtures. The latter feature, low processing temperatures, is especially attractive in reducing the thermal cycling (thus increasing mold life) to which molds of the injection equipment are subjected.

A wide range of molding pressures may be employed. Generally, the molding pressure (hydraulic) is between about 100 psi and about 2000 psi, although higher or lower pressures may be employed depending upon the molding technique used. Most preferably, the molding pressure is in the range of about 300 psi to about 800 psi.

The mold temperature must, of course, be at or below the gel point of the gel forming material in order to produce a self supporting body. The appropriate mold temperature can be achieved before, during or after the mixture is supplied to the mold. Ordinarily, the mold temperature is maintained at less than about 40° C., and preferably is between about 15° C. and about 25° C.

Thus, for example, it is expected that optimum production rates would be achieved with an injection molding process wherein the preferred gel forming materials (which exhibit gel points between about 30° C. and about 45° C.) are employed to form a mixture, and wherein the mixture is injected at less than 100° C. into a mold maintained at about 25° C. or less.

After the part is molded and cooled to a temperature below the gel point of the gel forming material, the green body is removed from the mold. The green body is then dried and placed directly into the furnace for firing.

In the furnace, the body is fired to produce the final product. The firing times and temperatures (firing schedules) ar regulated according to the powdered material employed to form the part. Firing schedules are well known in the art for a multitude of materials and need not be described herein. Because of the use of the novel molding composition of the present invention, no supporting materials are required during firing. Ordinarily for wax based systems, an absorbent, supporting powder is employed to assist in removing the wax from the part and to aid in supporting the part so that the intended shape of the product is maintained during firing. The present invention eliminates the need for such materials.

The fired products produced by the present invention result in very dense, net or near net shape products.

The following examples are presented in order to provide a more complete understanding of the invention. The specific techniques, conditions, materials and reported data set forth to illustrate the invention are exemplary and should not be construed as limiting the scope of the invention.

EXAMPLES

Batch Formulations

In the examples, solids loading based on weight percent is on a free moisture basis. Weight percent solids includes all residual material after removal of volatiles at 80° C. The solids quoted for volume percent are based on the ceramic powders used in the formulation.

The raw materials used in Examples 1-7 are as follows:
$Al_2O_3$, Alcoa A-16SG
MgO, Fisher Scientific M-49
Glycerine, Fisher Scientific G-33
Darvan C , aqueous solution, Vanderbilt Laboratories
TMA 25% tetramethyl ammonium hydroxide aqueous solution, Alfa Inorganics Water, deionized
Agar, S-100, Meer Corp.

EXAMPLE 1

A dispersion was formed in a sigma blender from 2500 g $Al_2O_3$, 2.5 g MgO, 480 g water, 4.59 g TMA solution, and 43.75 g Darvan C . To this mixture was added 36.56 g of agar and an additional 45.78 g of water. Following 1 hr. of mixing at room temperature, the contents were heated to 90° C. over a period of 45 min and mixed for an additional 15 min. The material was cooled to room temperature, shredded in a food processor (Hobart model KFP700) and analyzed for solids content. The solids content was 83.02% based on weight and 52.2% based on volume.

EXAMPLE 2

Formulation: 2500 g Al$_2$O$_3$, 2.5 g MgO, 60.25 g glycerine, 43.75 g Darvan C solution, 4.59 g TMA solution, and 41.02 g agar. Enough water was used to bring the total water in the system to 512.7 g. The ingredients, minus agar, were mixed in a heated sigma blender. Agar was added incrementally over a period of 130 min. The material temperature at the end of this period was 90° C. The batch was cooled to room temperature, removed from the blender, and shredded in the food processor to prepare feed for molding. The solids content was determined to be 84.5 wt % (51.2 vol %).

EXAMPLE 3

A batch was prepared as described in Example 2, except that the amount of glycerine and water equaled 60.25 g and 530.83 g, respectively. The solids content after the batch was shredded was 84.75±0.15% (two determinations), (51.6% by volume).

EXAMPLE 3A

To prepare a partial batch having slightly lower solids concentration, a portion of the shredded material from Example 3 was placed in a covered, shallow pan, misted with water, shaken for a short period of time and then allowed to equilibrate, undisturbed for 3 days. The final solids content was 83.35 wt % (49.6 vol %).

EXAMPLE 4

This formulation was prepared in the manner described in Example 3, except that glycerine was not used. The solids content of the material after shredding was 84.04% by weight and 53.8% by volume.

EXAMPLE 5

In this example, the ceramic powder was subjected to a pre-ball milling step before blending into a molding batch. The procedures used are as follows:

1536 g Al$_2$O$_3$, 512 g water, 15.36 g Darvan C solution, and 2.84 g TMA solution were added to a 2 gal polyurethane lined jar mill and ball milled using zirconia media for 6 hrs. The following additions were made: 500 g Al$_2$O$_3$ and 5 g Darvan C solution, ball milling 30 min; 300 g Al$_2$O$_3$, 3 g Darvan C solution, ball milling 30 min; 200 g Al$_2$O$_3$, 2.5 g MgO, 2.0 g TMA solution, and ball milling continued to give overall total of 10 hrs.

Brookfield viscosity readings were determined on the ball milled suspension. The suspension contained 81.7% dry solids.

| Brookfield Viscosity (spindle no. 21 with small sample adaptor): | |
|---|---|
| RPM | Viscosity, cP |
| 100 | 246.25 |
| 50 | 365 |
| 20 | 650 |
| 10 | 1050 |

The ball milled suspension, minus 384 g, was transferred to the sigma blender, and heat and mixing were applied. 38.56 g agar were added. The material was blended for a total of 45 min. The material temperature reached 90° C. After cooling, the material was removed from the blender and shredded. The solids content was 82.89 wt % (52.0 vol %).

EXAMPLE 6

The formulation was prepared free of the Darvan C dispersant used in Examples 1-5. A mixture of 42.4 g agar and 530 g H$_2$O was heated in a sigma blender to 91° C. 2500 g of Al$_2$O$_3$ and 2.5 g MgO, pre-heated to 110° C., was added incrementally to the blender. Small amounts of water were added periodically to maintain good mixing. After the total quantity of Al$_2$O$_3$ was charged, the material was cooled, removed and shredded. The solids content was 80.28±0.77 wt % (2 determinations). Before molding, the solids content was adjusted to 82.44 wt % (51.7 vol %) by allowing the material to stand in a shallow pan, exposed to the atmosphere under a cover containing holes.

EXAMPLE 7

This batch was prepared using ball milled alumina powder. The example illustrates that deagglomeration of the powder before making up a molding batch has a beneficial effect on densification.

Five hundred grams of Al$_2$O$_3$ and 0.5 g MgO were ball milled together at 40 wt % solids at pH 10 (NH$_4$OH) for 20 hrs. The sample was filtered and dried. The procedure was repeated to obtain 1000 g. This material is designated "pre-ball milled powder".

Preparation of the molding batch was continued as follows. A mixture containing 1918.02 g Al$_2$O$_3$, 1.91 g MgO, 33.59 g Darvan C solution, 3.55 g TMA solution, and 536.35 g water was ball milled in a 2 gal. polyethylene jar containing ZrO$_2$ media for 20 hrs. The ball milled suspension was transferred to the sigma blender and 834.19 g of the pre-ball milled dry powder was added with 14.60 g Darvan C solution and 1.54 g TMA solution. The mixture was blended for 70 min, 32.88 g agar was added, and heat was applied. When the temperature reached 60° C., 13 g additional agar was added. Blending was continued until the temperature reached 90° C. The batch was cooled, removed from the blender and shredded to prepare injection molding feedstock. The solids concentration was 82.9 wt % (51.8 vol %).

SUMMARY OF INJECTION MOLDING RUNS FOR EXAMPLES 1-7

Table 2 summarizes the molding of parts in the shape of an annular ring (dimensions 4.84 cm O.D.×3.70 cm I.D.×0.99 cm thickness) from the Al$_2$O$_3$ batches in Examples 1-7. Molding was done on a Boy 15S injection molding machine. Certain of the molded parts, indicated by part number in Table 2 were carried through densification. Firing conditions were 1600° C./1 hr. Density was determined by buoyancy. A dashed line data entry means that the measurement was not made.

TABLE 2

| Ex. No. | Part No. | Part Wt. g | Conditions Temp. °C. Nozzle/ Barrel | Gauge Pressure psi | °C. | Die Green | Density. g/cm$^3$ Fired | Shrink % |
|---|---|---|---|---|---|---|---|---|
| 1 | 8 | 19.87 | 75/80 | 500 | 19 | 2.28 | 3.86 | 15.3 |

TABLE 2-continued

| Ex. No. | Part No. | Part Wt. g | Temp, °C. Nozzle/ Barrel | Conditions Gauge Pressure psi | °C. | Die Green | Density, g/cm³ Fired | Shrink % |
| --- | --- | --- | --- | --- | --- | --- | --- | --- |
| | 13 | 19.93 | 75/85 | 500 | 15 | 2.29 | 3.89 | 14.9 |
| | 18 | 19.83 | 75/85 | 500 | 17 | — | 3.99 | 15.2 |
| | 26 | 20.04 | 75/88 | 500 | 17 | 2.26 | 3.82 | 14.9 |
| 2 | 3 | 20.17 | 80/85 | 420 | 19 | 2.32 | 3.90 | 14.8 |
| | 8 | 20.18 | 75/85 | 420 | 18 | 2.31 | 3.89 | 15.5 |
| 3 | 6 | 20.30 | 80/85 | 750 | 19 | — | 3.89 | 15.1 |
| | 9 | 20.32 | 80/85 | 950 | 19 | — | 3.91 | 14.9 |
| 3A | 9 | — | 80/85 | 400 | 19 | — | 3.89 | 15.7 |
| | 20 | — | 70/75 | 400 | 19 | — | 3.91 | 15.4 |
| 4 | 17 | 19.75 | 78/83 | 600 | 19 | — | 3.81 | — |
| 5 | 5 | 19.62 | 75/80 | 400 | 19 | — | 3.91 | — |
| | 7 | 19.66 | 75/80 | 400 | 19 | — | 3.91 | — |
| | 11 | 19.69 | 78/83 | 400 | 19 | — | 3.88 | — |
| 6 | 6 | — | 80/85 | 600 | 19 | — | 3.90 | — |
| | 16 | — | 75/80 | 600 | 19 | — | 3.88 | — |
| 7 | 7 | 23.22* | 80/85 | 600 | 17 | — | 3.97 | — |
| | 26 | 23.67* | 80/85 | 800 | 17 | — | 3.96 | — |

*These rings were not hollow. One face of the ring was filled with solid material.

EXAMPLE 8

A large batch of $Al_2O_3$ injection molding feed was prepared by repeating the following formulation five times and blending the material from each preparation: 2500 g $Al_2O_3$, 2.5 g MgO, 62 g glycerine, 4.5 g TMA solution, 43.75 g Darvan C, 43.94 g agar. The water in the system amounted to 487.3 g. The ingredients, minus agar, were mixed for 1 hr. in the sigma blender. Agar was added incrementally while heating the batch to 90° C. Mixing was continued 15 min after the batch reached 90° C. The contents were cooled, removed from the blender and shredded. Small adjustments in the solids content of individual batches were made by misting the shredded material in a covered shallow pan and allowing time for equilibration. The solids content of the combined batches was 84.2 wt % (50.6 vol %).

The rheology of the batch was examined by torque rheometry (HBI System 90). The material exhibited a torque value of 78±5 m-g at 93° C. This batch was used to mold parts in the form of a stator component of a turbine engine. The dimensions of the stator (green) are 5.87 cm (longest dimension)×3.68 cm (widest dimension)×4.22 cm (height). The parts were allowed to dry in the open air and then fired at 1600° C./1 hr. The final density determined by the buoyancy method was 3.95 g/cm³.

EXAMPLE 9

This example describes the preparation of a molding batch from $Y_2O_3$-$ZrO_2$.

Before preparing the batch, a supply of deagglomerated ceramic powder (composition 85.47 wt % $ZrO_2$, 8.0 wt % $Y_2O_3$ and 5.63 wt % $Al_2O_3$) was prepared by ball milling. The powder was ball milled in a 2 gal polyurethane lined jar, using $ZrO_2$ media, at 50 vol % solids and pH 20 ($NH_4OH$). The mean particle size of the suspension was 0.74 micron as determined by settling (Sedigraph 5000ET). The suspension was then filtered and dried. The following ingredients were mixed in the sigma blender for 1 hr.: 2850 g of the ball milled powder, 583.73 g water, 34.20 g Darvan C solution, and 6.27 g TMA solution. Initially, 30 g of agar was used in the mixture. The contents in the blender were heated to 85° C. and 12.6 g additional agar was added. Small amounts of water were added periodically to maintain good mixing. Total mixing time with the agar amounted to 1 hr. and the final temperature was 91.3° C. The material was cooled and shredded. The solids concentration was 82.6 wt % (44.6 vol %).

EXAMPLE 10

The following procedure was used to prepare a molding slip of silicon nitride. $MgAl_2O_4$ (Baikowski S50CR AS4) was calcined at 1325° C./2 hrs. and then dry milled for 3 hrs. using $ZrO_2$ media and screened (250 mesh). The surface area of the treated powder was 13 m²/g.

A supply of deagglomerated $Si_3N_4$ formulation was prepared from 3680 g $Si_3N_4$ (Denka 9FW), 160 g precalcined $MgAl_2O_4$ and 160 g $Y_2O_3$ (Molycorp). The powders were wet milled in 2-propanol for 7 hrs., screened through a 20 mesh screen and evaporated to dryness.

The ball milled silicon nitride powder mixture was added to the sigma blender pre-heated to 95° C. The powders were mixed about 90 min with deionized water containing Daxad 34A9R and agarose (Seakem LE, FMC Corp) was added. The blender was shut off after the material temperature reached 90° C. and all of the agarose was incorporated. The formulation contained 1840 g $Si_3N_4$, 80 g $MgAl_2O_4$, 80 g $Y_2O_3$, 777.8 g $H_2O$, 10.0 g Daxad 34A9 and 62.24 g agarose.

The material was removed at room temperature and shredded in the food processor. The solids content was 75.3 wt % (47.6 vol %). The silicon nitride batch was molded in the Boy 15S machine in forms consisting of annular rings, tensile test bars and rectangular bars. The parts were dried in the open air at room temperature and fired at 1765° C. under 1 atmosphere of nitrogen.

The following properties were measured on the parts.
Ring:
 Green density 1.73 g/cm³
 Fired Properties:
  Weight 11.59 g
  Density (geometrical) 2.96 g/cm³
  O.D.×I.D×thickness=3.8456±0.014×2.9166±0.020×0.7941±0.004 cm (17.52±0.74% average shrinkage)
Rectanqular bar:
 Green density 1.79 g/cm³
 Fired weight 7.79 g (5.23% loss)
 Density (geometrical) 2.95 g/cm³

Dimensions 10.283×1.0196×0.2519 thickness (average shrinkage 16.88±0.47%)

| Notebook References for the Examples | |
|---|---|
| Example | Reference |
| 1 | A1735 P24 (Batch 3) |
| 2 | A1735 P26 (Batch 4) |
| 3 | A1735 P28 (Batch 5) |
| 4 | A1735 P31 (Batch 6) |
| 5 | A1735 P33 (Batch 7) |
| 6 | A1735 P36 (Batch 9) |
| 7 | A1735 P48 (Batch 17) |
| 8 | A1735 P59 (Batch 21) |
| 9 | A1735 P69 |
| 10 | A1735 P28 |

Having thus described the invention in rather full detail, it will be understood that these details need not be strictly adhered to but that various changes and modifications may suggest themselves to one skilled in the art, all falling within the scope of the invention as defined by the subjoined claims.

We claim:

1. A method of forming an article comprising the steps of:
    (a) forming a mixture comprising
        (1) ceramic powder, said powder comprising about 40% to 60% by volume of said mixture,
        (2) an agaroid gel forming material having a gel strength measured at a temperature between 0° C. and about 22° C. on a gel consisting essentially of about 1.5 wt % of the agaroid gel forming material and water, of at least about 100 g/cm², and
        (3) an agaroid gel forming material solvent, said mixture being formed in a blender that provides shearing action thereto and said blender being heated to raise the temperature of said mixture to about 70° C. to 100° C.;
    (b) cooling said mixture to a temperature below the gel point thereof;
    (c) heating to a first temperature and supplying the mixture to a mold, said first temperature being in the range from 60° C. to 100° C.; and
    (d) molding the mixture at a second, cooler temperature at or below the gel point of the agaroid gel forming material to produce an article comprising the powder and a gel comprising the agaroid gel forming material, said second cooler temperature being in the range from 10° C. to 35° C.

2. The method of claim 1, further comprising the step of removing said mixture from said blender.

3. The method of claim 2, further comprising the step of shredding said mixture to form a particulate consistency.

4. The method of claim 1, wherein the gel forming material comprises between bout 0.5% and about 6% by weight of the mixture.

5. The method of claim 4, wherein the mixture further comprises a mono-, di- or poly-ol compound.

6. The method of claim 5, wherein the mono-, di-, or poly-ol compound and mixtures thereof are present in an amount up to about 20% by weight of the gel forming material and the gel forming solvent in the mixture.

7. The method of claim 1, wherein the agaroid is agar, agarose, or a mixture thereof.

8. The method of claim 4, wherein the agaroid is agar, agarose, or a mixture thereof.

9. An injection molding process comprising the steps of:
    (a) forming a mixture comprising
        (1) powder comprising about 40% to 60% by volume of said mixture and being selected from group consisting of oxides, borides, nitrides, silicides and carbides of metals, non-metals and mixtures thereof,
        (2) an agaroid gel forming material having a gel strength, measured at a temperature between 0° C. and about 22° C. on a gel consisting essentially of about 4 wt % of the agaroid gel forming material and water, of at least about 500 g/cm²,
        (3) an agaroid gel forming material solvent, and
        (4) a carrier, said mixture being formed in a blender that provides shearing action thereto and said blender being heated to raise the temperature of said mixture to about 70° C. to 100° C.;
    (b) cooling said mixture to a temperature below the gel point thereof;
    (c) injecting the mixture into a mold, the mixture being heated prior to the injection step at a first temperature above the gel point of the agaroid gel forming material, said first temperature being in the range from about 60° C. to 100° C.; and
    (d) cooling the mixture in the mold to a second temperature below the gel point of the agaroid gel forming material to form an article comprising the powder and a gel comprising the agaroid gel forming material, said second temperature being in the range from about 10° C. to 35° C.

10. The process of claim 8, further comprising the step of removing said mixture from said blender.

11. The process of claim 10, further comprising the step of shredding said mixture to form a particulate consistency.

12. The process of claim 8, wherein the gel forming agent is present in the mixture in an amount between about 0.2 and about 6% by weight of the mixture, and the solvent is present in an amount sufficient to dissolve the gel forming material at the first temperature and to function as a carrier.

13. The process of claim 8, wherein the mixture further comprises a mono-, di-, or poly-ol compound and mixtures thereof.

14. The process of claim 13, wherein the mono-, di-, or poly-ol compound and mixtures thereof is present in an amount up to about 20% by weight of the gel forming material and the solvent in the mixture.

15. The process of claim 9, wherein the agaroid is agar, agarose, or a mixture thereof.

* * * * *

UNITED STATES PATENT AND TRADEMARK OFFICE
CERTIFICATE OF CORRECTION

PATENT NO. : 5,250,251
DATED : October 5, 1993
INVENTOR(S) : A.J. Fanelli, G.B. Marsh, J.V. Burlew, C.P. Ballard and W.S. Frei It is certified that error appears in the above-identified patent and that said Letters Patent is hereby corrected as shown below:

IN THE CLAIMS:

In Claim No. 10, column 12, line 40, "claim 8" should read --claim 9--.
In Claim No. 12, column 12, line 45, "claim 8" should read --claim 9--.
In Claim No. 13, column 12, line 51, "claim 8" should read --claim 9--.

Signed and Sealed this

Twenty-fifth Day of April, 1995

*Attest:*

BRUCE LEHMAN

*Attesting Officer*     *Commissioner of Patents and Trademarks*